United States Patent

Karmel

[11] Patent Number: 4,586,536
[45] Date of Patent: May 6, 1986

[54] FLOW CONTROL VALVE
[75] Inventor: Amir Karmel, Birmingham, Mich.
[73] Assignee: General Motors Corporation, Detroit, Mich.
[21] Appl. No.: 682,746
[22] Filed: Dec. 17, 1984

Related U.S. Application Data

[63] Continuation-in-part of Ser. No. 514,666, Jul. 18, 1983, abandoned.

[51] Int. Cl.[4] ............................................. F16K 17/26
[52] U.S. Cl. .................................... 137/599; 137/503; 137/613; 137/625.34
[58] Field of Search ............... 137/498, 501, 503, 505, 137/505 B, 599.1, 625.34, 625.29, 601, 613

[56]       References Cited
       U.S. PATENT DOCUMENTS

| | | |
|---|---|---|
| 1,063,164 | 5/1913 | McCumber et al. |
| 1,477,244 | 12/1923 | Collins et al. |
| 2,192,042 | 2/1940 | Hoffman ........................... 137/505.13 |
| 2,362,631 | 11/1944 | Harris . |
| 2,791,238 | 5/1957 | Bryant .............................. 137/625.34 |
| 2,942,619 | 6/1960 | Jackson .................... 137/501 |
| 3,053,271 | 9/1962 | Crittenden et al. ......... 137/625.34 X |
| 3,374,803 | 3/1968 | Leveque ................................. 137/503 |
| 3,544,222 | 1/1971 | Kihara ................................. 137/501 |
| 3,977,423 | 8/1976 | Clayton ............................ 137/489 X |
| 4,000,754 | 1/1977 | Risk ...................................... 137/487 |
| 4,200,120 | 4/1980 | Kimata et al. ....................... 137/613 |

FOREIGN PATENT DOCUMENTS 920837 3/1963 United Kingdom .

Primary Examiner—Martin P. Schwadron
Assistant Examiner—Stephen M. Hepperle
Attorney, Agent, or Firm—R. L. Phillips

[57]       ABSTRACT

A hydraulic flow control valve is disclosed having a secondary orifice that is connected downstream and in series with one of two parallel main orifices and has a flow area that is varied by the pressure gradient across the valve so as to reduce the sensitivity of the flow through the valve to pressure gradient variations thereacross.

1 Claim, 6 Drawing Figures

WITHOUT MAIN ORIFICE 21

FLOW CONTROL VALVE

This is a continuation-in-part of U.S. patent application Ser. No. 514,666, filed July 18, 1983 now abandoned.

TECHNICAL FIELD

This invention relates to hydraulic flow control valves and more particularly to pressure gradient variation compensation therefor.

BACKGROUND OF THE INVENTION

A common problem with hydraulic flow control valves is the sensitivity of the flow through the valve to pressure gradient variations thereacross. For example, the typical response to pressure gradient variations is non-linear and increases with the pressure difference. So in situations which require a control of the flow to various levels, there must generally be provided some form of pressure gradient measurement and variable area gain strategy.

SUMMARY OF THE INVENTION

The present invention eliminates any such need with a pressure compensating feature that operates to substantially reduce the sensitivity of the flow throughout the pressure gradient variation range and particularly about a nominal pressure gradient. This is accomplished by bypassing part of the flow around one main orifice and in series through a second main orifice and then a variable secondary orifice whose area is determined by the pressure gradient across the valve. The valve is tuned so that the secondary orifice is half open for a predetermined nominal pressure gradient and closes or opens gradually as the pressure gradient increases or decreases, respectively. The resulting flow then diminishes only a disproportionately small amount whether the pressure gradient decreases or increases from the nominal.

DESCRIPTION OF THE PREFERRED EMBODIMENT

These and other objects, features and advantages of the present invention will become more apparent from the following description and drawing in which.

Figure 1:
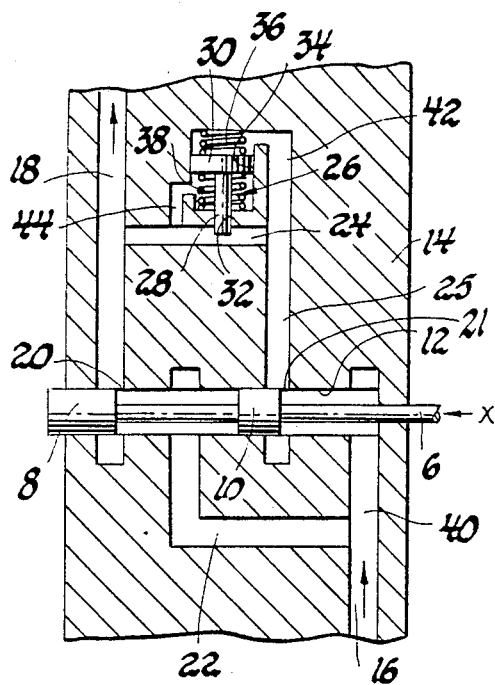
FIG. 1 is a diagramatic view of the preferred embodiment of the valve according to the present invention and wherein the secondary orifice is half open.

Referring to FIG. 1, the valve comprises a spool element 6 with lands 8 and 10 of equal diameter slidably mounted in a bore 12 of a housing 14 so as to connect an inlet passage 16 to an outlet passage 18 through two parallel main orifices 20 and 21 for flow in the directions indicated by the arrows. For such connections, the inlet passage 16 is provided with branches 22 and 40 leading to the valve bore 12 and the spool valve element 6 is displaceable therein to vary the flow area of the main orifices 20 and 21 past lands 8 and 10 from zero and in the same proportion to each other and thereby the flow from the inlet to the outlet passage.

Figure 2:
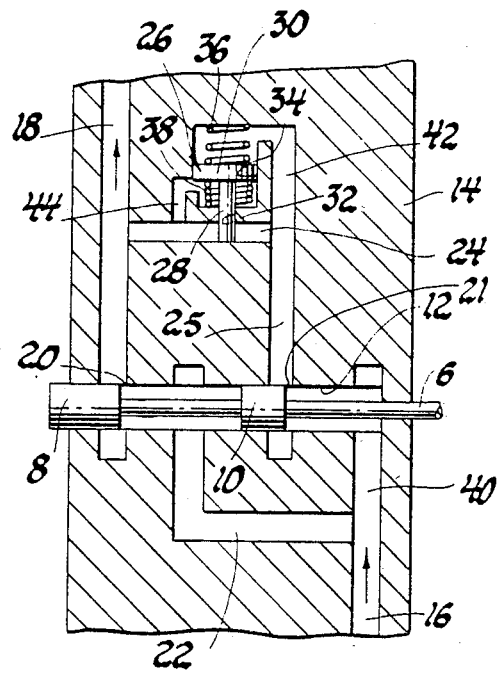
FIG. 2 is a view similar to FIG. 1 but with the secondary orifice closed.
Figure 3:
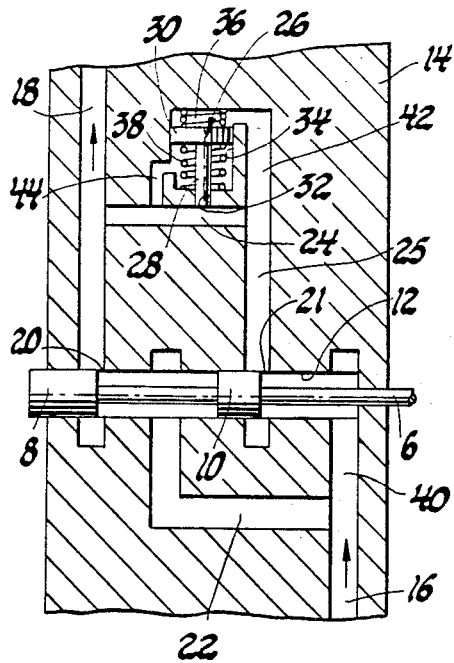
FIG. 3 is a view similar to FIG. 1 but with the secondary orifice wide open.
Figure 4:
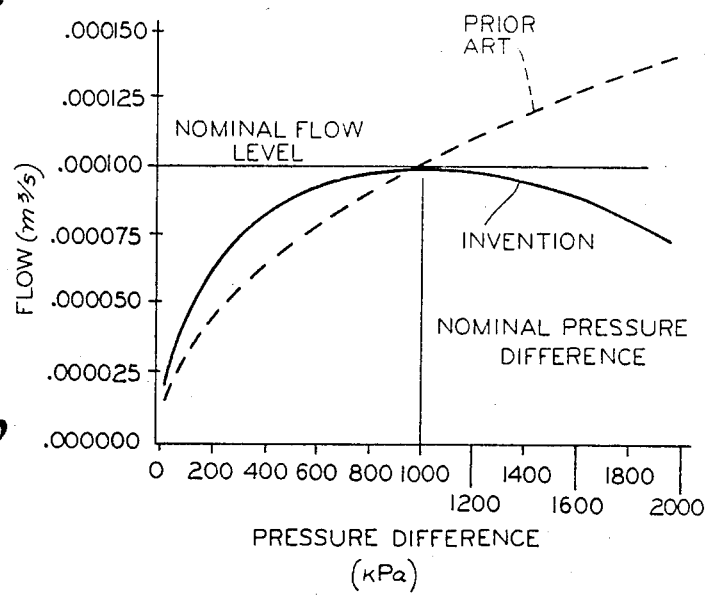
FIG. 4 is a graph comparing the flow characteristics of the valve of the present invention with that of prior art.

In addition to the main orifices controlled by the spool valve displacement, flow is transferred through a variable secondary orifice 24 which is connected in series with the main orifice 21 by a passage 25 between the inlet passage 16 and outlet passage 18 and has a flow area determined by the pressure gradient across the valve (i.e. pressure difference between inlet passage 16 and outlet passage 18) and by the main orifice 21. For this effect, there is provided a valve element 26 with a long small diameter land 28 and short large diameter land 30 slidably mounted in bores 32 and 34, respectively, in the valve housing. The end of the long land 28 operates in the secondary passage 25 to define the secondary orifice 24 while the large diameter land 30 is engaged on opposite sides in the bore 34 by coil springs 36 and 38. The secondary passage 25 which is connected by the main orifice 21 to the inlet passage 16 and is open at the other end to the outlet passage 18 is also connected upstream and downstream of the secondary orifice 24 by passages 42 and 44, respectively, to the closed bore 34 on opposite sides of the large diameter land 30. And thus the pressure gradient across the valve is transmitted to act on land 30 so as to move the valve element 26 against the spring 38 and thereby cause the other land 28 to move in a direction to reduce the flow area of the secondary orifice 24 downstream of the main orifice 21. The valve is tuned by the selection of the biasing springs 36 and 38 so that the secondary orifice 24 is half open (see FIG. 1) for a predetermined nominal pressure gradient (see FIG. 4) and closes or opens gradually as the pressure gradient increases or decreases, respectively (see FIGS. 2 and 3). This is in contrast with the typical prior art valve with fixed rather than variable (pressure compensated) flow control wherein as shown in FIG. 4, the flow response is essentially linear and increases with the pressure difference either side of the nominal. The present invention on the other hand permits limiting the flow rate to the desired level as shown in FIG. 4 and reduces the sensitivity of the flow to pressure gradient variations such that the flow diminishes only a disproportionately small amount in a wide range either side of the nominal pressure difference. So while the conventional valve can regulate flow to a constant value, the valve of the present invention enables a variable flow depending mainly on the area of the parallel main orifices, as it compensates for pressure variations across the valve. And it will also be appreciated that the invention is also applicable to a fixed main orifice arrangement as well as the variable one shown.

Figure 6:
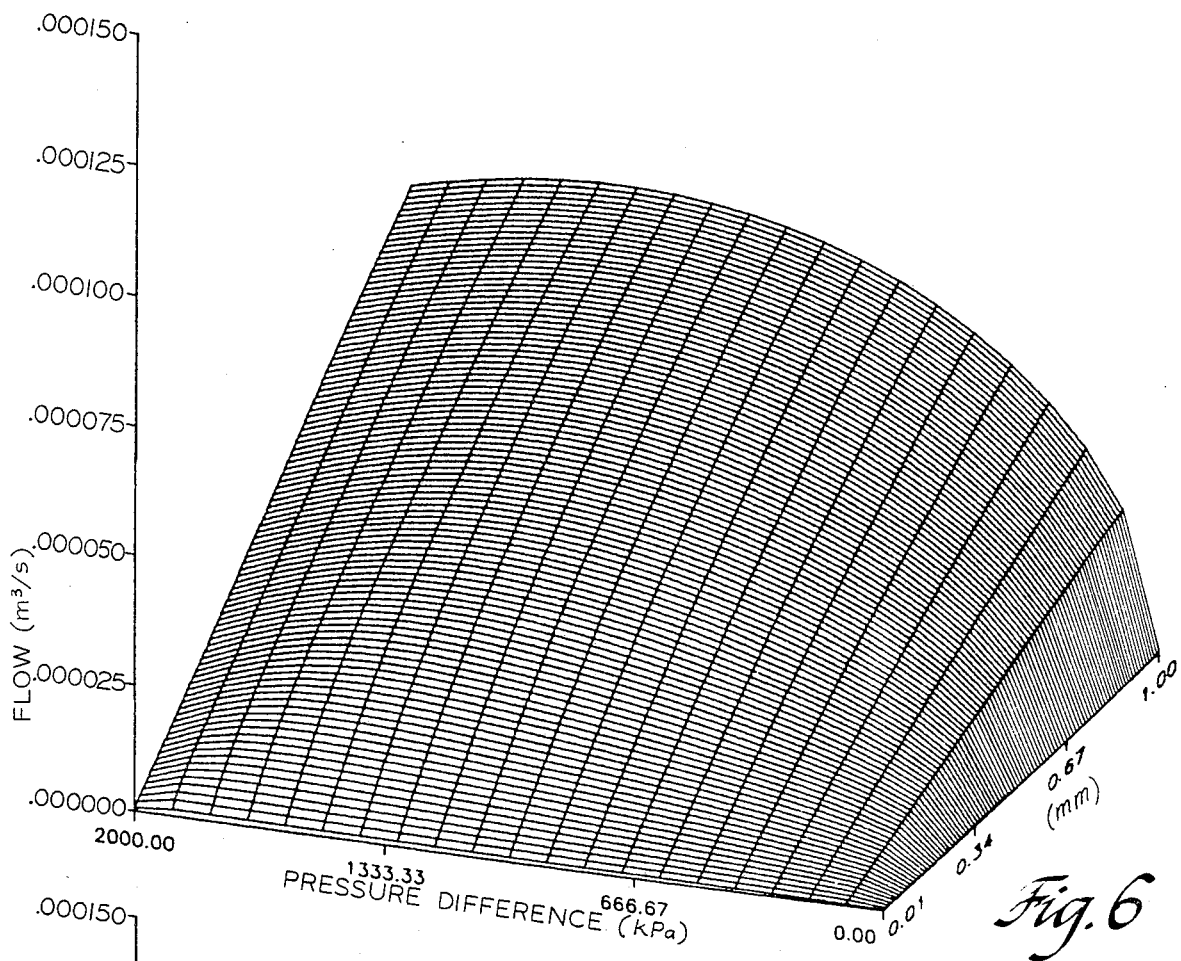
FIGS. 5 and 6 are three-dimensional plots depicting the midrange improvement obtained by the secondary orifice being downstream and in series with one of the two parallel main orifices.
Figure 5:
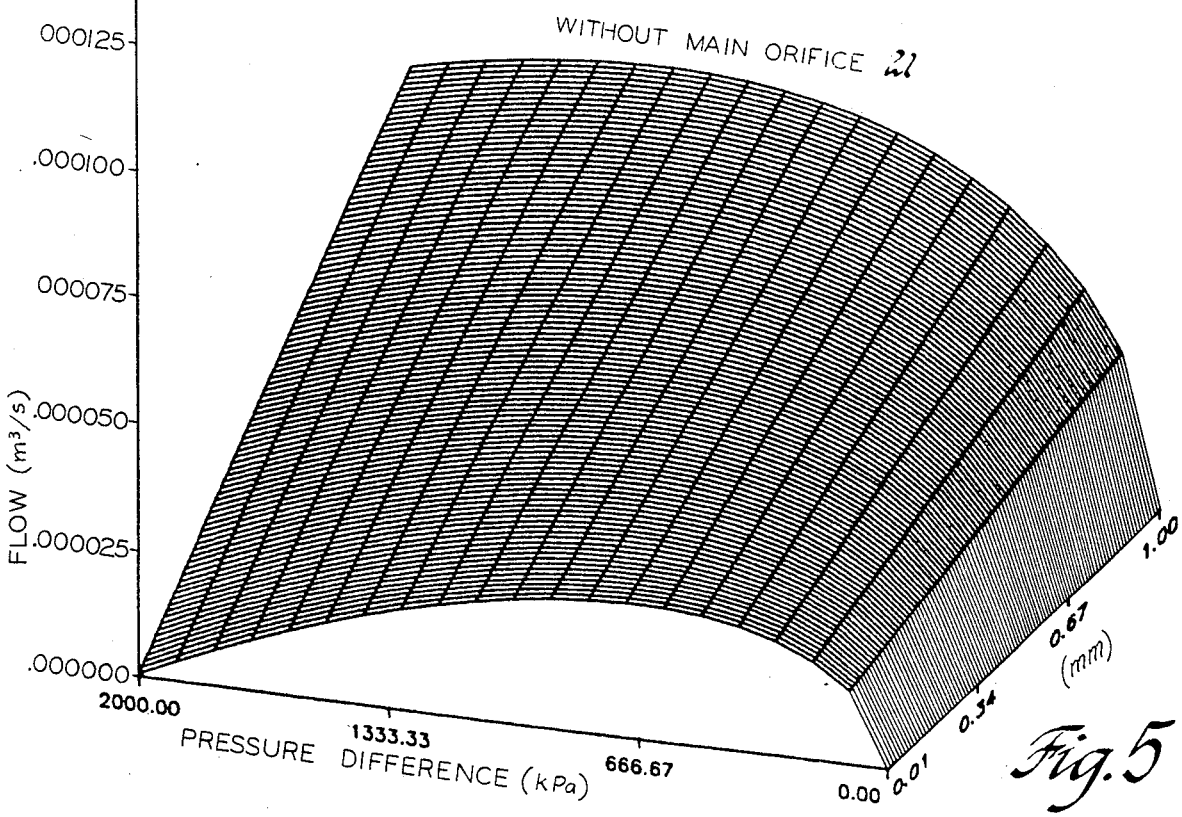

The significance of the secondary orifice being downstream and in series with one of the two parallel main orifices is seen by comparing the plots in FIGS. 5 and 6 of flow versus pressure gradient versus main orifice flow areas (20, 21) as represented by displacement of the spool valve 6 in the direction X in FIG. 1. FIG. 5 shows the results that occur when there is no second main orifice or flow restriction 21 upstream of the secondary orifice 24 whereas FIG. 6 shows the results where there is in accordance the present invention. As can be seen, at a given X or primary orifice area, the overall flow through the valve is less affected by changes in the pressure gradient with the addition of the second main orifice 21. Furthermore, it is seen in FIG. 6 that the addition of the second main orifice 21 allows precise flow regulation at very small values down to zero over a wide presure gradient range as compared with when there is no such main orifice and as a result, there is allowed flow regulation only at the two extremes as seen in FIG. 5.

The above described preferred embodiment is thus illustrative of the invention which may be modified within the scope of the appended claims.

The embodiments of the invention in which an exclusive property or privilege is claimed are defined as follows:

1. A flow control valve having an inlet, an outlet, varibale dual primary orifice means for connecting said inlet to said outlet through a pair of primary orifices that are connected in parallel with each other and have flow areas that are variable from zero and in the same proportion to each other, and pressure compensating secondary orifice means for providing a variable secondary orifice that is connected in parallel with one of said primary orifices and in downstream series relationship with the other primary orifice, and whose flow area is partially open at a predetermined nominal pressure gradient between said inlet and outlet and closes or opens gradually as the pressure gradient increases or decreases, respectively, so as to cause said one primary orifice to provide coarse flow regulation while said secondary orifice in conjunction with said other primary orifice provides fine flow regulation all over a finite flow range from zero to thereby reduce the sensitivity of the flow through the valve to pressure gradient variations across the valve so as to minimize flow deviations from a nominal flow level within said finite flow range down to zero throughout a substantial pressure gradient range.

* * * * *